Dec. 11, 1951     S. J. FRICANO     2,578,182
SKEWER
Filed July 7, 1949
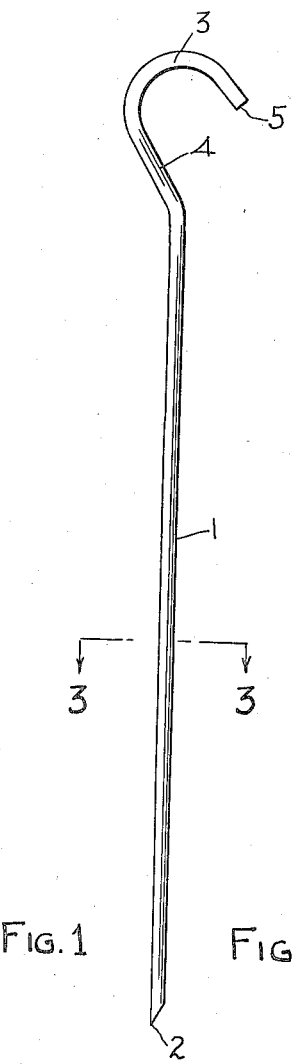
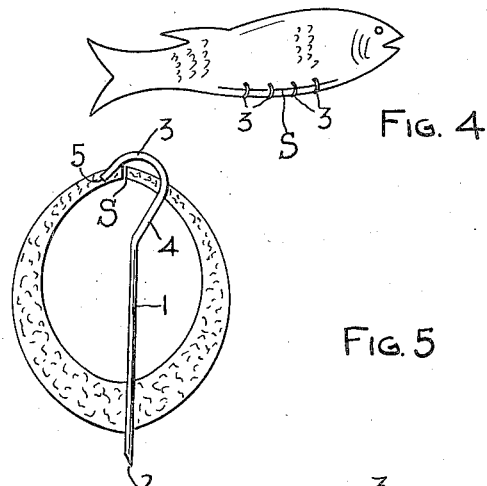
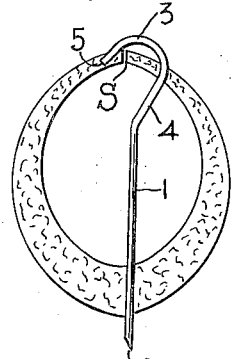
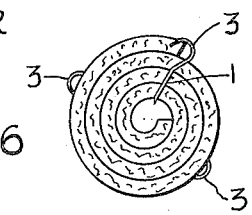
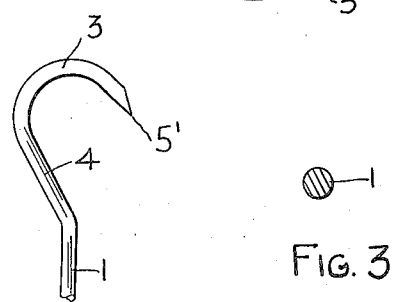
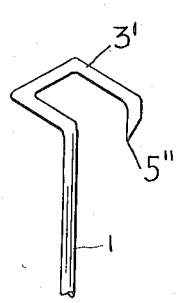
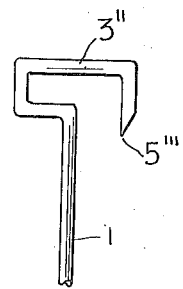
INVENTOR.
SANTO J. FRICANO
BY
William Isler
ATTORNEY.

Patented Dec. 11, 1951

2,578,182

UNITED STATES PATENT OFFICE 2,578,182

SKEWER

Santo J. Fricano, Inglewood, Calif.

Application July 7, 1949, Serial No. 103,397

2 Claims. (Cl. 17—1)

This invention relates, as indicated, to skewers.

A primary object of the invention is to provide a skewer having a novel form of head which is well-adapted for closing seams in fowl, fish and other edible products.

Another object of the invention is to provide a skewer of the character described, which can be manufactured inexpensively and sold at a low price, which is extremely strong and sturdy, which is sanitary and non-tainting, which is convenient to use, and which can be easily and quickly cleaned after each use.

Other objects and advantages of the invention will be apparent during the course of the following description.

In the accompanying drawings, forming a part of this specification, and in which like numerals are employed to designate like parts throughout the same.

Fig. 1 is a front elevational view of a preferred form of skewer, embodying the invention;

Fig. 2 is a side elevational view of the skewer, as viewed from the right side of Fig. 1;

Fig. 3 is a cross-sectional view, taken on the line 3—3 of Fig. 1;

Fig. 4 illustrates one use of the skewer;

Fig. 5 is an enlarged transverse cross-sectional view of the fish shown in Fig. 4, taken at a point where one of the skewers has been inserted;

Fig. 6 illustrates another use of the skewer;

Fig. 7 is a fragmentary view, similar to Fig. 1, but showing a slight modification;

Fig. 8 is a fragmentary view, similar to Fig. 7, but showing a modified form of head for the skewer, and Fig. 9 is a view similar to Fig. 8, but showing still another modified form of head.

Referring more particularly to Figs. 1, 2 and 3, the skewer, which is preferably formed from stainless steel wire, will be seen to comprise an elongated stem or shank 1 having a pointed or sharpened lower end 2 and a head 3 in the form of a curved hook, which is connected to the stem by a straight portion 4, the portion 4 extending at a somewhat obtuse angle to the stem 1, for a purpose to be presently described. The end 5 of the hook 3 is, in this case, blunt, and is spaced at an appreciable distance from the portion 4 of the skewer.

The skewers may be used for numerous purposes in the culinary arts, being designed to avoid the use of sewing strings, toothpicks, etc., in such operations as binding roasts, fowl, fish, etc., pinning steaks to prevent curling while broiling, holding together "pigs" in blankets, mock duck or chicken or similar meat dishes. It may also be used for holding together three and four layer cakes, to prevent the layers from sliding relatively to each other during frosting thereof; eating corn off the cob, etc.

Figs. 4 and 5 of the drawing illustrate the function of the hook of the skewer in temporarily suturing the steam S of a fish which has been stuffed or from which the bones and other undesirable parts have been removed. In this use of the skewers, the skewers are inserted or embedded in the fish in such a manner that a portion of each hook penetrates the fish at the other side of the seam. In this manner, the seam is maintained closed during the broiling or cooking of the fish, but the skewers can be easily removed from the fish after cooking, by simply inserting the tine of a fork under the hook 3 and lifting the skewer out of the fish by means of the fork. In inserting the skewers, the relatively large obtuse angle between the portion 4 and stem 1 of the skewer serves to facilitate entry of the portion 4 of the skewer into the fish.

In Fig. 6, the use of the skewers for holding together the convolutions of a rolled roast is illustrated. In this connection, the use of the end 5 of the hook for preventing unrolling of the end of the roll is well illustrated.

In Fig. 7, the end of the hook 3 of the skewer is pointed or sharpened as at 5' for facilitating entry of the hook into the roast or fowl.

In Fig. 8, the head of the skewer is also in the form of a hook 3' having a sharpened point 5'', but the hook is of diamond-shaped contour or outline. The hook may have a sharpened or pointed end, as shown, or may be blunt.

In Fig. 9, the head of the skewer is also in the form of a hook 3'' having a sharpened point 5''', but the hook is of generally rectangular contour or outline. Here, again, the hook may have a sharpened or pointed end, as shown, or may be blunt.

The modified forms of skewers shown in Figs. 8 and 9 function in exactly the same manner as the skewers of Figs. 1 and 7.

The skewers may be of various lengths, depending upon the particular application or use, and being made of stainless steel wire, can be easily and inexpensively fabricated in commercially desirable quantities. Moreover, they are extremely sturdy and strong, are sanitary and non-tainting, are convenient to use, and can be easily and quickly cleaned after each use.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. A skewer formed of metallic wire having an elongated, thin straight stem smooth throughout its length and provided with a sharpened lower end, said stem being insertable into one portion of an edible product, and a hook-like head comprising a straight portion extending at an obtuse angle to said stem, a second portion straight throughout its length and substantially parallel with and spaced from said first-named straight portion, and a curved portion connecting the upper ends of said straight portions, said second-named straight portion of the head adapted for entry into another portion of said edible product to be skewered at a point spaced laterally from the point of entry of the stem.

2. A skewer, as defined in claim 1, in which said second-named straight portion of the head terminates at its lower end at a point spaced a substantial distance from the extended axis of the stem.

SANTO J. FRICANO.

REFERENCES CITED

The following references are of record in the file of this patent:

UNITED STATES PATENTS

| Number | Name | Date |
| --- | --- | --- |
| 1,113,929 | Brown | Oct. 13, 1914 |

FOREIGN PATENTS

| Number | Country | Date |
| --- | --- | --- |
| 166,987 | Great Britain | July 27, 1921 |

OTHER REFERENCES

Catalog of the International Screw Company, Inc., page 17, January 12, 1933.